United States Patent [19]

Schmidt

[11] 3,984,618

[45] Oct. 5, 1976

[54] SUPPORT BODY FOR THE CONDUCTORS OF A LOW TEMPERATURE CABLE

[75] Inventor: Fritz Schmidt, Erlangen, Germany

[73] Assignee: Siemens Aktiengesellschaft, Munich, Germany

[22] Filed: Feb. 2, 1976

[21] Appl. No.: 654,399

[30] Foreign Application Priority Data

Feb. 19, 1975 Germany.......................... 2507019

[52] U.S. Cl.................................. 174/15 S; 174/13; 174/130
[51] Int. Cl.².................. H01B 12/00; H01L 39/00
[58] Field of Search.............. 174/15 S, 15 C, 13, 174/34, 130, 131 R, 126 S, 128 S, 131 A

[56] References Cited
UNITED STATES PATENTS

| | | | |
|---|---|---|---|
| 3,514,524 | 5/1970 | Buchhold | 174/130 X |
| 3,634,597 | 1/1972 | Ziemek | 174/15 S |
| 3,668,297 | 6/1972 | Buchhold et al. | 174/15 S |
| 3,691,287 | 9/1972 | Falke | 174/15 S |
| 3,760,092 | 9/1973 | Woolcock et al. | 174/15 S |
| 3,864,504 | 2/1975 | Beck | 174/15 S |

FOREIGN PATENTS OR APPLICATIONS 2,202,288   7/1972   Germany.......................... 174/15 S

*Primary Examiner*—Arthur T. Grimley
*Attorney, Agent, or Firm*—Kenyon & Kenyon Reilly Carr & Chapin

[57] ABSTRACT

A support body for the conductors of a low-temperature cable including a plurality of carrier elements in tandem which, along with connecting parts arranged therebetween, form a common molding, in which the outer surfaces of the carrier elements contain notches or slots for conducting the cooling medium in the axial direction to permit heat generated at the conductor to be easily removed to permit a construction which requires no special measures for supporting the carrier elements when the support bodies are wrapped in cabling machines.

10 Claims, 3 Drawing Figures

SUPPORT BODY FOR THE CONDUCTORS OF A LOW TEMPERATURE CABLE

BACKGROUND OF THE INVENTION

This invention relates to the support bodies for layers of individual conductors of a low temperature cable in general, and more particularly to an improved support body construction which provides better cooling and better support.

Support bodies for use with low temperature cables, such as super conductors in wire or ribbon form which consist of a plurality of ring shaped carrier elements arranged one behind the other in the axial direction with connecting parts arranged therebetween to form a common tubular molding having an outside diameter smaller at the connecting points than at the carrier elements are known. In both d-c and three phase cables in which the conductors are to be cooled to a low temperature, e.g., super conductors, it is advantageous to make the cables flexible to permit winding on the cable drums and facilitate laying in the field. In order to obtain flexibility, it is common practice to use one or more layers of individual conductor wires or ribbons. For example, individual aluminum wires which are covered with a super-conducting layer on their outer surface can be used. The layers of conductors or wires are advantageously arranged on the outer circumference of support bodies. Furthermore, they may be twisted such that a length of the cable which is independent of temperature during cooling of the cable to a very low temperature is possible. Such is disclosed, for example, in U.S. Pat. No. 3,541,221.

In U.S. Pat. No. 3,668,297, a flexible low temperature cable is disclosed in the form of a tubular conductor comprising individual coil conductors. The individual conductors have cross sections which are approximately rectangular and are arranged with mutual spacing side by side on the outer circumference of a support body of plastic. Illustrated support bodies include support rings which may be held together using wires, or a support helix comprising a wide plastic helix on which a further narrow helix may also be placed.

Another support arrangement is disclosed in U.S. Pat. No. 3,864,508. Moldings of annular cross section with longitudinally arranged slots at their outer surfaces are used as support elements for the longitudinally arranged helically wound conductor strands. The individual moldings are joined together through the use of connecting links to form a link chain. Between the individual moldings, provisions are made for the passage of a cooling medium. Clamps or wires, for example, may be used as connecting links.

Another support arrangement is disclosed in U.S. Pat. No. 3,691,287. This arrangement includes a plurality of support rings which may be combined with a wrapping of foils or tapes to form a supporting, hose-like structure. In addition, these support rings may be connected with each other loosely through the use of rods.

To manufacture a low temperature cable using these known support bodies however, rigid guidance means are required if the ribbon shaped or wire shaped individual conductors are to be placed on the outer surface of the support bodies. Since the necessary guide means must be provided in the available cabling machines over long distances of, for example, 20 meters, difficulties arise in wrapping the support bodies. Specifically, elongations or buckling of the helical support body and axial displacement of the support rings or annular moldings must be prevented by taking additional special measures at the cabling machine. Furthermore, the known types of support bodies must be mechanically stable in order for continuous production of a cable to be possible.

If, in addition, the individual support rings or annular support elements are held together using metallic connecting links such as clamps, and if the super-conductors wound on the support body are operated with a-c current, additional eddy current losses can be produced by the residual magnetic field in the support body.

There is a further danger in a cable with such support bodies that the individual support rings or annular moldings may shift in the event of temperature gradients, such as those occurring during cooling or warming processes. The larger spacing which then occurs between adjacent support rings or annular moldings along with diameter changes occurring in the support body of helical design result in an inferior placement of the individual conductors. As a result, a danger exists that the conductors can move and thereby that individual conductor sections can become normally conducting. With a type of support body taught in U.S. Pat. No. 3,730,966, displacements between individual support rings or annular moldings cannot occur. In the disclosed arrangement a corrugated central structure of arbitrary length is used as a support body. This structure consists substantially of a hollow, cylindrical plastic body which has radial constrictions at regular spacings in the longitudinal direction. Thus, ring shaped carrier elements are produced which are held together by means of connecting parts of somewhat smaller diameter which form a common molding therewith. The carrier elements in the connecting parts have approximately the same axial width. Furthermore, the connecting parts are each provided with rectangular openings, arranged one behind the other in a circumferential direction, to allow access for a cryogenic medium flowing inside the support body to the conductors placed on the support body. Contact with the medium occurs only in the radial direction in the vicinity of the constrictions of the connecting parts of the support body. However, an axial flow of the cryogenic medium in the longitudinal direction below the conductor layer which is placed on the support body is not possible since the conductor layer surrounds the carrier element with a tight fit. This results in an increase of the flow resistance of the cryogenic medium in the axial direction and cooling of the conductor layer becomes more difficult. If a conductor layer with superconductive material is placed on this known support body, then the heat occurring in the event of a quench, i.e., if the superconductive material becomes normally conducting, cannot be removed fast enough. Thus, in the cable taught in U.S. Pat. No. 3,730,966 direct placement of the superconducting individual conductors on the support body is not provided.

Thus, it can be seen that none of these prior art arrangements are completely satisfactory. In view of this, the need for an improved support body providing better cooling and better support becomes evident.

SUMMARY OF THE INVENTION

It is the object of the present invention to provide such an improved design for a support body. In particular, it is the object to improve upon the design taught in U.S. Pat. No. 3,730,966. In design of the present invention, all of the difficulties associated with previously developed support bodies are avoided or reduced to the greatest extent possible. In particular, the present invention provides a support body for a low temperature cable such as a superconducting cable which permits direct wrapping with superconducting individual conductors in wire or ribbon form. The support body has the necessary mechanical stability and is still sufficiently flexible and permits relatively easy removal of heat.

The support body of the present invention starts out with an arrangement having a plurality of ring shaped carrier elements arranged one behind the other in the axial direction which together with connecting parts arranged therebetween form a common tubular molding, the outside diameter of which is smaller at the connecting parts than at the carrier elements, i.e., an arrangement such as that described in U.S. Pat. No. 3,730,966. To overcome the problems of the prior art, the present invention provides recesses distributed in the circumferential direction in the outer surfaces of the carrier elements. These recesses are used for conducting the cooling medium in the axial direction. Equalization between the inner flow of the cooling medium in the tubular molding and the flow directly under the conductors is provided by radial openings in the region of the constrictions of the connecting parts.

In addition, the support body design has a sufficient flexibility. Its support surfaces which carry the individual conductors in wire or ribbon form are mechanically braced against each other in a sufficiently stable and uniform manner so that no further support measures are necessary, particularly when placing the individual conductors on the annular support surfaces of the carrier elements in cabling machines. Support surfaces of the support body can be pre-fabricated with sufficient material thickness so that they can take up the pressure occurring in the radial direction without noticeable deformation. In addition, the support body has no areas of uneven elongation or contraction, i.e., no displaceable gaps, for example, since it can be fabricated as a single molding of fairly great length. The molding is made sufficiently stretchable in the longitudinal direction to prevent shifts of the support body relative to the conductors during the cooling down process. Shifts of this nature are possible, for example, in bodies with gaps.

In accordance with a particularly advantageous further embodiment of the support body, the inside surfaces of the connecting parts and carrier elements form a common inner surface of a hollow cylinder. Such a design has as its major advantage the fact that the flow resistance in the interior of the molding of the carrier elements and connecting parts in the longitudinal direction is negligibly small. As a result, improved cooling of the conductors is achieved, particularly should a quench occur.

In accordance with a further advantageous embodiment of the support body, the support elements are provided with notches or slots extending helically around the axis of the molding. It then becomes possible to wrap the conductors in ribbon or wire form at right angles to the notches or slots. With such a construction, the notches or slots can be relatively wide without the danger of conductor deformation.

DETAILED DESCRIPTION OF THE PREFERRED EMBODIMENTS

Figure 1:
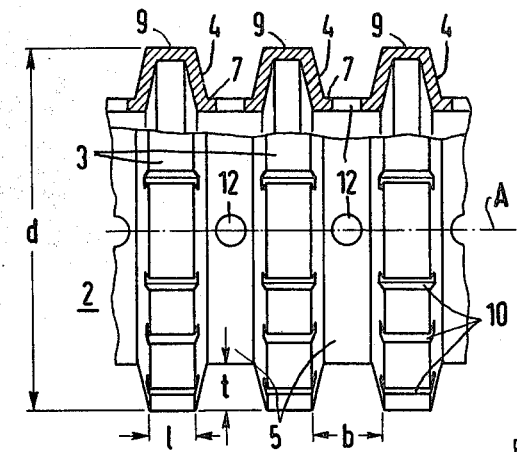
FIG. 1 is an elevation view, partially in cross section of a first embodiment of the support body of the present invention.

A first embodiment of the present invention is illustrated by FIG. 1 which is an elevation view partially in cross section. The support body designated generally as 2 is a formed structure, i.e., a molding, of substantially hollow cylindrical form with an outside diameter $d$. On this outside diameter conductors which must be cooled to a low temperature can be applied. These are not illustrated in the figure. The molding 2 is provided with constrictions of predetermined width b and radial depth t at regular spacings in the lengthwise direction. This construction results in the formation of individual, ring shaped carrier elements 3 with an outside diameter $d$ and an axial width 1 at their outside surface. These merge into ring shaped connecting parts 5 with an outside diameter having the dimension $(d-2t)$. Joining the two parts are washer-like lateral parts 4 approximately perpendicular to the axis of the support body. In the constriction region, annular grooves 7 are therefore formed in the circumferential direction of the molding between the carrier elements 3. The cooling medium can flow in these annular grooves 7. The figure illustrates only three carrier elements 3 and two connecting parts 5. It will be recognized that the molding 2 may contain any number of carrier elements 3, lateral parts 4 and associated connected parts 5 and can be made as long as is necessary or desired.

Upon cooling, a lengthwise contraction of the support body relative to the conductor layer applied to it is taken up by the lateral parts 4 which are perpendicular to the axis A. The change in angle associated therewith is so slight, however, that the contraction has practically no effect on the diameter d of the carrier element 3. The outer surface of the molding 2, i.e., the outer surface of the carrier elements 3 designated by the reference numeral 5, contains a plurality of longitudinal slots uniformly distributed in the circumferential direction. Radially these slots can extend approximately to the bottom of the grooves 7. They may be sawed into the carrier elements 3. Cryogenic medium flowing in the interior of the molding can, through these slots 10, get directly to the conductors which are applied to the molding. The cryogenic medium also flows in the lengthwise direction and thereby removes heat produced in the conductors in a relatively simple manner. Equalization between the flow in the interior of the molding 2 and the flow directly under the conductors in the slots 10 is made possible by means of holes 12 or other openings in the connecting parts 5.

Figure 2:
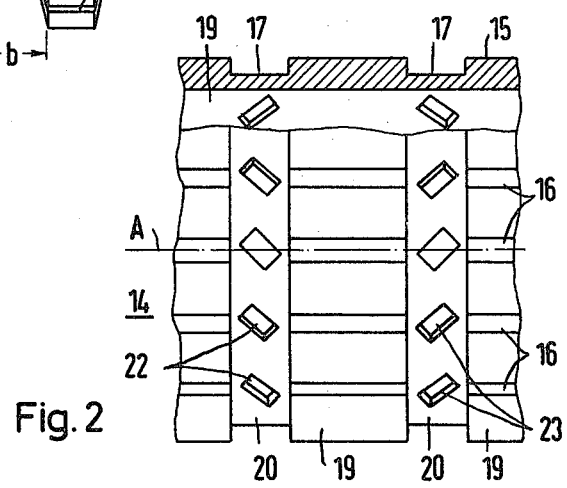
FIG. 2 is a similar view of a second embodiment of the support body of the present invention.

A second embodiment of the present invention is illustrated by FIG. 2. In this embodiment, the support body comprises a tubular molding 14 the outer surface of which contains slots 16 and 17. The slots 17 runs circumferentially and the slots 16 longitudinally. This construction thus divides the tubular molding 14 into individual carrier elements 19 arranged one behind the other in the longitudinal direction and spaced from each other by means of connection parts 20 of somewhat smaller outside diameter. The outer surfaces of the connecting parts 20 form the bottom of grooves 17 running in the circumferential direction. Formed in the bottom of the grooves 17 are a plurality of rectangular openings 22 and 23 which are regularly distributed over the circumference. It is preferable that the rectangular openings 22 in the groove 17 be inclined at approximately 135° to the axis A of the molding 14, while those in adjacent grooves i.e., the cutouts 23, be inclined at an angle of approximately 45°. Thus, in alternate grooves 17 the cutouts are alternately inclined at angles of about 45° and 135° relative to the axis A of the support body. As the cable with such a support body is cooled down, the necessary elongation relative to the conductors is assumed by the connecting parts 20 with their approximately diagonally arranged cutouts 22 and 23. At the same time these cutouts maintain equalization between the flow inside the support body and the flow below the conductors in the slots 16. These conductors will be placed on the support body in a manner similar to that shown in FIG. 3.

Figure 3:
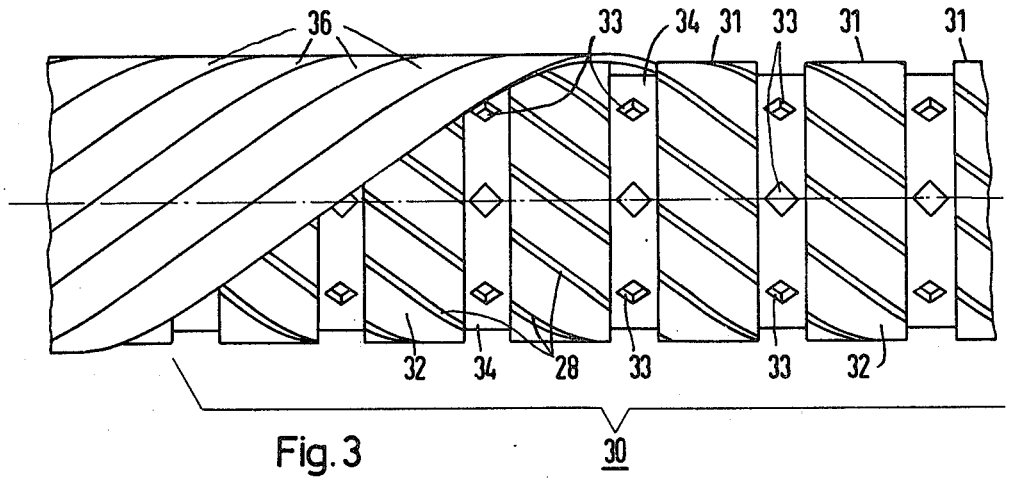
FIG. 3 is an elevation view of a third embodiment of a support body according to the present invention also showing some conductors in ribbon form wound therearound.

FIG. 3 illustrates a further embodiment of the present invention. The construction of this embodiment is quite similar to that of FIG. 2. It includes a tubular molding 30 having carrier bodies 32 and connecting parts 34. However, in contrast to the embodiment of FIG. 2 the slots in the carrier bodies 32 extend in a helical manner about the axis of the support body in the outer surfaces 31 of the carrier bodies. In the connecting parts 34, radial openings 33 which are of essentially diamond shape are arranged. The diagonals of these diamonds are respectively approximately perpendicular and parallel to the axis A of the molding. As illustrated by a number of conductors 36 shown in FIG. 3, the conductors may be wound about this support body 30 in a helical manner such as to intersect the helical direction of the slots 28 in the carrier bodies 32 at a right angle. With this embodiment, the width of the slots 28 can be chosen somewhat larger than the width of the notches 10 of FIG. 1 or the slot 16 of FIG. 2 because of this right angle engagement. As a result, improved cooling action can be achieved for the conductors. Advantageously, the width of the notches 10 parallel to the axis or slots 16 also parallel to the axis is selected to be smaller than or at most equal to the diameter of the conductor wires to be placed on the support body in question surrounding the support body helically. By doing so, any chance of the wires becoming hooked when the conductors are applied is eliminated.

It is also of advantage to choose the depth of the notches or slots to be only so deep that the stiffness of the carrier element of the support body is not adversely affected.

The support bodies of FIGS. 2 and 3 have a particularly low flow resistance in their interior since the inside surface, formed by the inside surfaces of the carrier elements and connecting parts arranged between them, is a smooth hollow cylinder. The only interruptions are the radial openings. With this construction, suitable support bodies can be fabricated in a simple manner from plastic tubes provided with slots in the circumferential direction and in the axial direction, which are made, for example, by milling. The required radial openings can then be made, for example, by drilling or punching.

A flexible conductor of, for example, superconducting wires or ribbons placed on a support body according to FIGS. 1 to 3 retains its constant length independent of temperature change if the wires or ribbons placed in a single layer on the cylindrical support body have a pitch angle of $$\theta \approx \arcsin \sqrt{\alpha_L/\alpha_S}$$

with respect to the longitudinal axis of the cable or conductor where $\alpha_L$ and $\alpha_S$ are the coefficients of expansion of the conductor and support body respectively. In order not to limit the transport current in the conductor, it is advantageous that the pitch angle of the conductor wires, and thus the ratio of coefficients or expansion be chosen as large as possible. For this reason, only plastic materials can be given serious consideration for use in a practical support body according to the present invention. In contrast to metals, the coefficient of expansion of plastic materials is about one order of magnitude larger. By designing the support bodies in accordance with the present invention, care is taken that the contraction of the support bodies upon cooling becomes effective only in the radial direction with the support body retaining a constant length in the axial direction due to its proper flexibility so that the conductors lying on it will not become displaced relative to the support body. In addition, it is of great advantage if the coefficient of expansion of the support bodies is chosen so that it is approximately the same as that of electrical insulation which may be arranged around the individual conductors and may consist, for example, of wrapped plastic tape. For reasons of cost, and also because of its good electrical and mechanical properties at low temperature, polyethylene, for example, can be used for electrical insulation. Thus, polyethylene also is a good material for the support body. Particularly good is high density polyethylene which has adequate mechanical strength and can be processed simply and cheaply.

The wall thickness of the individual parts of the support body according to the present invention, particularly the thickness of the annular carrier elements is made large enough so that the support body can take up a relatively large radial pressure without noticeable deformation. Such pressure occurs, for example, when an a-c cable having a conductor layer wound on the support body and surrounded by a further coaxial conductor layer separated by an insulating layer, is cooled down.

Thus, an improved support body for layers of individual conductors in a cable which is cooled to a low temperature has been shown. Although specific embodiments have been illustrated and described, it will be obvious to those skilled in the art that various modifications may be made without departing from the spirit of the invention which is intended to be limited solely by the appended claims.

What is claimed is:

1. In a support body for layers of individual conductors which layers are concentric to the axis of a cable cooled to a low temperature such as a cable made up of superconductors in wire or ribbon form, the support body including a plurality of ring shaped carrier elements arranged one behind the other in the axial direction which, through means of connecting the parts attached therebetween form a common tubular molding, the outside diameter of which is smaller at the connecting parts than at the carrier elements, the connecting parts being provided with openings for the passage of a cooling medium in the radial direction, the improvement comprising a plurality of recesses distributed in the circumferential direction in the outer surfaces of the carrier elements for conducting the cooling medium in the axial direction.

2. A support body according to claim 1, wherein the inner surfaces of the connecting parts and the carrier elements form the common surface of a hollow cylinder.

3. A support body according to claim 1, wherein said recesses are notches.

4. A support body according to claim 1 wherein said recesses are slots.

5. A support body according to claim 1 wherein said recesses run parallel to the axis of the molding.

6. A support body according to claim 1 wherein the recesses are disposed helically around the axis of the molding.

7. A support body according to claim 2 wherein the openings for the passage of cooling medium in the radial direction have rectangular cross section with the sides of the rectangles disposed at an angle with respect to the axis of the molding.

8. A support body according to claim 6, wherein the inclination of the sides of said rectangles alternates between approximately 45° and 135° with respect to said axis on successive connecting parts.

9. A support body according to claim 2 wherein said openings for the passage of the cooling medium in a radial direction have a diamond shaped cross section with the diagonals of said diamonds arranged at least approximately perpendicular and parallel to the axis of the molding.

10. A support body according to claim 9 wherein said recesses are disposed helically about the axis of the molding.

* * * * *